(12) United States Patent
Rammhofer et al.

(10) Patent No.: US 9,541,140 B2
(45) Date of Patent: Jan. 10, 2017

(54) HYDRAULIC SECTION HAVING A VENTILATING DEVICE

(71) Applicant: Schaeffler Technologies AG & Co. KG, Herzogenaurach (DE)

(72) Inventors: Thomas Rammhofer, Sasbach (DE); Jan Grabenstatter, Gernsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 478 days.

(21) Appl. No.: 14/052,839

(22) Filed: Oct. 14, 2013

(65) Prior Publication Data

US 2014/0034441 A1 Feb. 6, 2014

Related U.S. Application Data

(63) Continuation of application No. PCT/DE2012/000390, filed on Apr. 16, 2012.

(30) Foreign Application Priority Data

May 6, 2011 (DE) .......... 10 2011 100 842
May 30, 2011 (DE) .......... 10 2011 102 814

(51) Int. Cl.
*F16L 37/00* (2006.01)
*F16D 25/12* (2006.01)
*F16D 48/02* (2006.01)
*F16L 33/207* (2006.01)

(52) U.S. Cl.
CPC .............. *F16D 25/12* (2013.01); *F16D 48/02* (2013.01); *F16D 2048/0212* (2013.01); *F16D 2500/5016* (2013.01); *F16D 2500/5118* (2013.01); *F16L 33/207* (2013.01)

(58) Field of Classification Search
CPC ...... F16D 2125/16; F16D 25/12; B60T 11/30; B60T 17/222; F15B 21/044; F16L 33/207; F16L 33/2071; F16L 33/2073; F16L 33/2075; F16L 33/2078
USPC ....... 60/584, 592; 285/104, 239, 240, 286.1, 285/921, 924
See application file for complete search history.

(56) References Cited

U.S. PATENT DOCUMENTS

| | | | |
|---|---|---|---|
| 4,607,670 A * | 8/1986 | Compton | F15B 7/005 137/614.04 |
| 5,816,046 A | 10/1998 | Paeth et al. | |
| 6,546,727 B2 * | 4/2003 | Bockling | B60T 11/10 137/493 |
| 7,946,630 B2 * | 5/2011 | Popp | F15B 7/00 285/305 |

(Continued)

FOREIGN PATENT DOCUMENTS

| | | |
|---|---|---|
| DE | 19540753 | 1/1997 |
| DE | 102007032042 | 1/2009 |
| EP | 1978271 | 10/2008 |

*Primary Examiner* — Michael Leslie
*Assistant Examiner* — Dustin T Nguyen
(74) *Attorney, Agent, or Firm* — Volpe and Koenig, P.C.

(57) ABSTRACT

A hydraulic section (1) for actuating a vehicle clutch having a master cylinder (3), a slave cylinder (2) and a hydraulic line (4) which connects both cylinders and is divided into two line sections by a ventilating device (5). The line sections of the hydraulic line which act as a siphon (4a) and a riser (4b) are guided together to said ventilating device (5), such that they are spaced apart from one another, in a chamber which is formed from at least one of these ends.

8 Claims, 2 Drawing Sheets

(56) References Cited

U.S. PATENT DOCUMENTS

2006/0202476 A1\* 9/2006 Eggert .................. F16L 37/088
  285/305
2009/0014275 A1\* 1/2009 Vollmer ................ F16D 25/088
  192/85.51
2009/0032755 A1   2/2009 Pritchard \* cited by examiner

HYDRAULIC SECTION HAVING A VENTILATING DEVICE

INCORPORATION BY REFERENCE

The following documents are incorporated herein by reference as if fully set forth: International Application No. PCT/DE2012/000390, filed Apr. 16, 2012; German Patent Application No. 102011100842.3, filed May 6, 2011; and German Patent Application No. 102011102814.9, filed May 30, 2011.

BACKGROUND

The invention relates to a hydraulic section for actuating a vehicle clutch.

During the actuation of a clutch pedal and therefore the pressure loading of a hydraulic fluid within a hydraulic section for clutch actuation, including essentially of a master cylinder which is connected to a clutch pedal, a slave cylinder, and a hydraulic line which connects said cylinders, it is known that air can accumulate in the end region of said hydraulic section, at the slave cylinder. Although this quantity is low, it has a negative effect on the disengagement travel at the slave cylinder in order to actuate the clutch. For this reason, as is known, the hydraulic line is laid so as to rise between the master cylinder and the slave cylinder, in a direction of the master cylinder, with the result that the introduced air is transported in the direction of the master cylinder in the form of one or more bubbles during the operation of the vehicle as a result of the buoyancy forces, and said air can escape into the reservoir via the snifting bore of said master cylinder.

It can occur, however, that the installation space does not allow a continuously rising course of the hydraulic line in the direction of the master cylinder to be realized.

SUMMARY

It is therefore the object of the invention to provide a hydraulic section for actuating a vehicle clutch, the ventilation of which is ensured via the master cylinder during operation, without the use of an additional component and without a continuously rising pathway of the hydraulic line in the direction of the master cylinder.

This object is achieved by way of a hydraulic section for actuating a vehicle clutch having one or more features of the invention.

According to one aspect of the invention, a hydraulic section for actuating a vehicle clutch having a master cylinder, a slave cylinder, and a hydraulic line which connects both cylinders is divided by a ventilating device into two line sections, said line sections of the hydraulic line which act as siphon and riser being guided together to said ventilating device, such that they are spaced apart from one another, in a chamber which is formed from at least one of these ends to said ventilating device.

In one advantageous refinement of the invention, the end of the siphon is configured as a connector of the ventilating device and the end of the riser is configured as a housing. However, it is also possible to configure the end of the siphon as a housing and the end of the riser as a siphon.

It is advantageous here that the end of that line section of the hydraulic line which acts as siphon opens with its hole laterally at the top into the chamber, and the lower inner wall of the end of the hole of that line section of the hydraulic line which acts as riser forms the lower boundary of the chamber in the radial direction.

It is advantageous here that there is a height difference between both holes, in order to make air buoyancy possible.

A further advantageous embodiment of the invention provides that the hole is routed further with a length in the housing and the internal diameter of the housing is widened radially at least over a region of said length. However, it is also possible that the hole is not routed further in the housing which is formed, but rather ends at the latter if it is, for example, a separate component with a housing, which separate component is incorporated into the hydraulic section.

Furthermore, it is advantageous that the radial widening of the internal diameter of the housing forms the chamber in the housing in the axial direction at least over said region. A further advantageous embodiment of the invention provides that the ventilating device is arranged in the hydraulic line at the highest point of the line section which comes from the slave cylinder.

The boundary of the chamber in the axial direction in the interior of the housing is formed advantageously by the end face of the connector which is introduced into the housing.

It is likewise advantageous to insert a ventilating device which is provided with connections as a separate component into the hydraulic section.

A further advantageous refinement of the invention provides that the hydraulic section is provided with a plurality of ventilating devices.

BRIEF DESCRIPTION OF THE DRAWINGS

In the following text, the invention will be explained in greater detail using one exemplary embodiment and associated drawings, in which.

DETAILED DESCRIPTION OF THE PREFERRED EMBODIMENT

Figure 1:
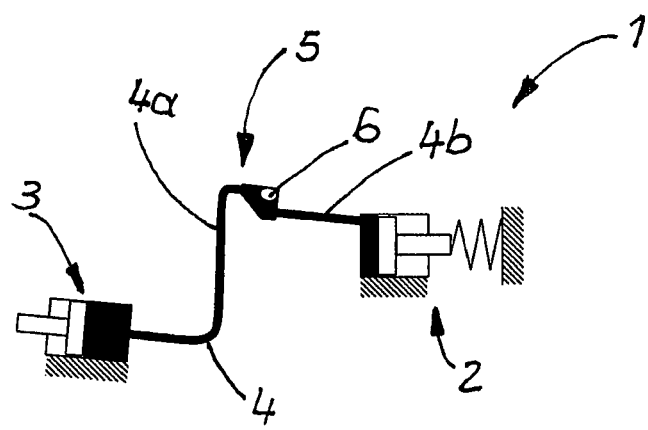
FIG. 1 is a diagrammatic illustration of one embodiment of a hydraulic section according to the invention for clutch actuation during a disengaging operation.
Figure 2:
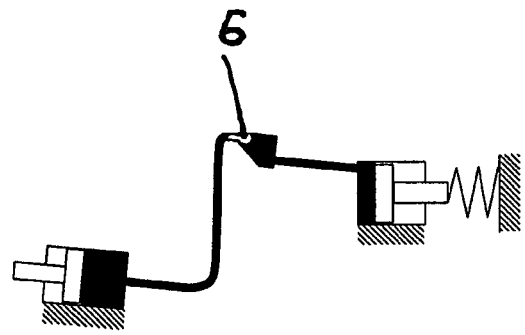
FIG. 2 shows the hydraulic section from FIG. 1 during an engaging operation.

FIGS. 1 and 2 show a hydraulic section 1 for clutch actuation in two different operating positions. The hydraulic section 1 is formed essentially of a master cylinder 3 and a slave cylinder 2. These cylinders are connected to one another via a hydraulic line 4. As is apparent from FIGS. 1 and 2, the hydraulic line 4 is laid so as to rise in the direction of the slave cylinder 2, it being possible for the air 6 which is present in the hydraulic line 4 to be transported to the master cylinder 3 via a line section which falls in the direction of the master cylinder 3, and acts as a siphon 4a and is therefore called siphon 4a, in which master cylinder 3 a ventilating device 5 which is introduced into the hydraulic line 4 at the highest point of the line section which comes from the slave cylinder 2 therefore prevents, at the start of the siphon 4a, the air 6 which is situated in the hydraulic section 1 from moving back in the direction of the slave cylinder 2 during the disengaging operation.

Here, the line section which is situated upstream of the siphon 4a is called riser 4b.

After the disengaging operation according to FIG. 1, the air 6 in the riser 4b upstream of the siphon 4a is displaced in the direction of the slave cylinder 2. Since the time between the disengaging operation and the engaging operation is usually small and the air 6 is compressed greatly by the system pressure and therefore has considerably lower buoyancy forces, the air 6 in the riser 4b before the engaging operation (FIG. 2) virtually does not rise in the riser 4b upstream of the siphon 4a, as a result of which the following applies to the permissible volume in the region of the siphon 4a:

$$V_{siphon} < V_{swept,standard} - V_{riser}, \text{ where}$$

$V_{swept,standard}$ is the swept volume which the slave cylinder 2 displaces during the disengaging operation, and $V_{riser}$ is the volume in the riser 4b between the siphon 4a and the air bubble 6 after the disengaging operation.

In this hydraulic section 1 according to the invention with an integrated ventilating device 5, furthermore, $V_{riser}$ is relatively small, that is to say the volume of the siphon 4a can be selected to be large.

Figure 3:
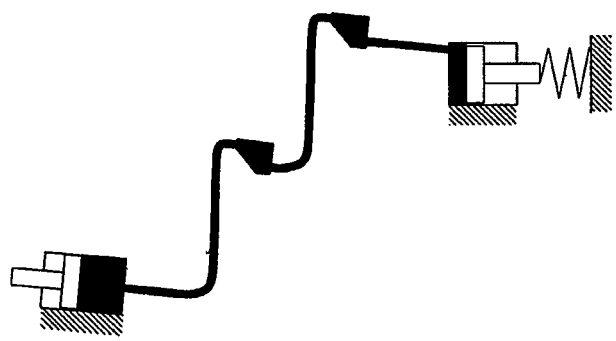
FIG. 3 is a diagrammatic illustration of a further embodiment of a hydraulic section according to the invention.

FIG. 3 shows a further embodiment of a hydraulic section 1 according to the invention, in which any desired siphon heights and therefore components in the engine compartment can be overcome as a result of a plurality of siphons 4a with a respectively incorporated ventilating device 5 being connected behind one another.

Figure 4:
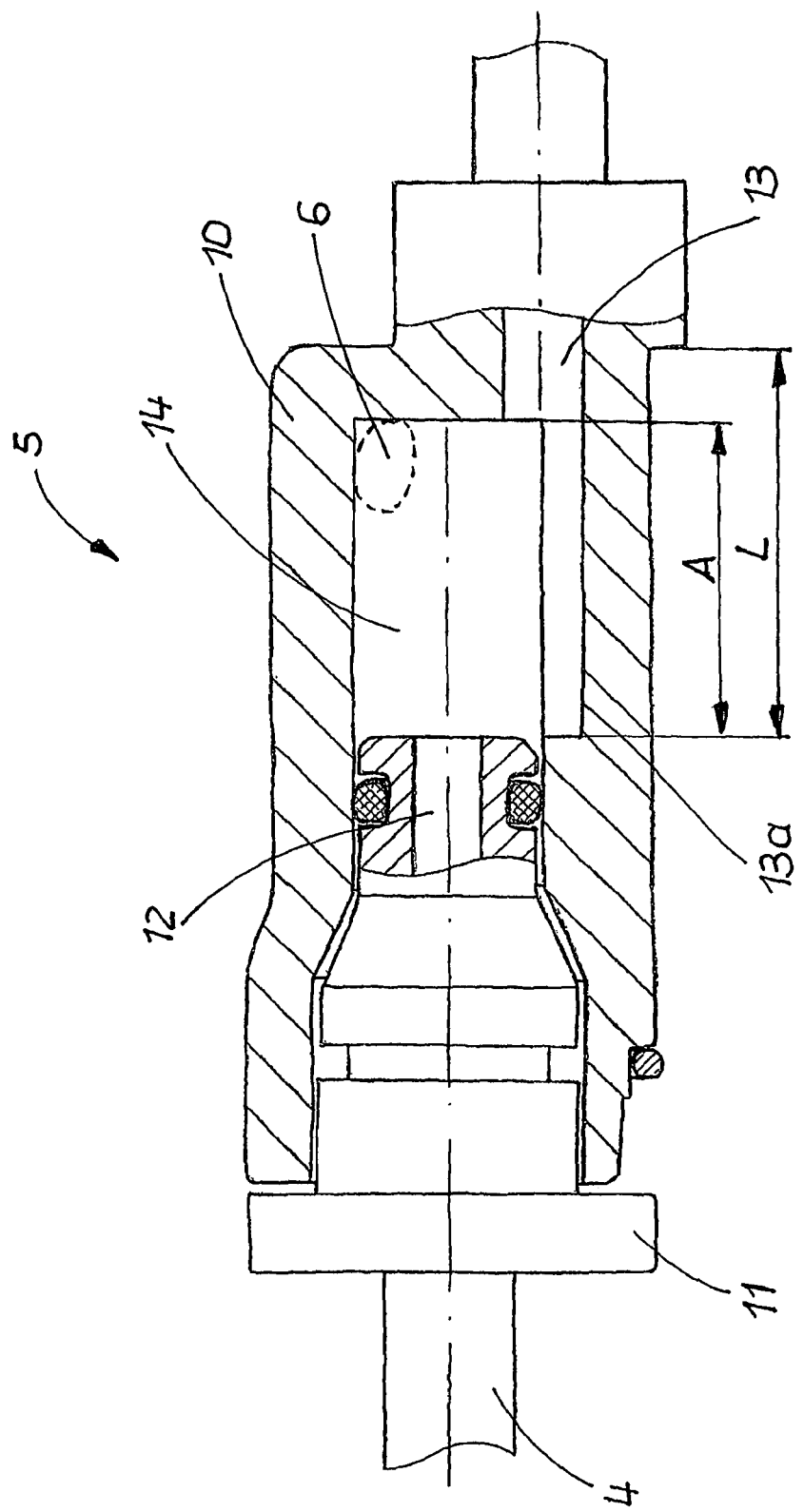
FIG. 4 shows an enlarged ventilating device in section, which ventilating device is introduced into the hydraulic section according to FIGS. 1 to 3.

FIG. 4 shows a sectional illustration of the ventilating device 5 which is incorporated into the hydraulic section 1. This ventilating device 5 is formed essentially of a housing 10 which is configured as a bush which is molded or welded, for example, to the line section which acts as siphon 4a, in order to ensure that it is seated in a positionally correct manner and a further anti-rotation safeguard can therefore be dispensed with.

A connector to the slave cylinder 2 can also be provided on the housing 10. The housing 10 can then be attached directly to the slave cylinder 2, by way of an anti-rotation safeguard with respect to the slave cylinder 2.

The basic concept of the construction of said ventilating device 5 is to radially enlarge the region of the hydraulic line 4 at its end over a predefined region to such an extent that the hydraulic fluid flows through completely or partially below the air bubble 6 in the direction of the slave cylinder 2 when flowing through this space which is formed. This region of the hydraulic line therefore forms the actual ventilating device 5, without the use of an additional housing or component.

However, the ventilating device 5 can also be configured as a separate component which is inserted between the two line sections.

As can be seen from FIG. 4, the housing 10 is constructed as follows:

On the end side of the housing 10, that end of the hydraulic line 4 which is configured in the form of a connector 11 is inserted sealingly into said housing 10 to such an extent that a chamber 14 which is preferably of cylindrical configuration, just like the housing 10, remains upstream of the connector 11 which is penetrated by a hole 12. The inlet, in the form of a hole 13, which comes from the slave cylinder 2 is situated at the opposite lower end of the chamber 14. This is arranged in the housing 10 and dimensioned in such a way that the hole 12 of the connector 11 lies as high as possible above the hole 13 of the inlet of the slave cylinder 2, that is to say the axis of symmetry of the hole 12 of the connector 11 and therefore of the inlet of the master cylinder 3 lies parallel to and spaced apart from the axis of symmetry of the hole of the inlet of the slave cylinder 2.

Due to both holes 12, 13, which are spaced apart from one another, of the inlets being guided together from the side and from below into the chamber 14, the flow speed of the hydraulic fluid which flows from the master cylinder 3 to the slave cylinder 2 which is enriched with air is reduced.

At the same time, during this slowing of the flow speed, the air rises in the form of an air bubble 6 into an upper region of the chamber 14 and remains on the vertical wall there. As a result, the hydraulic fluid is displaced and "falls" below said air bubble 6, as a result of which it passes via the hole 13 into the connector of the slave cylinder 2.

If the fluid flows from the slave cylinder 2 to the master cylinder 3, the moving hydraulic fluid column moves the air bubble 6 through the hole 12 of the connector 11, or of the inlet of the master cylinder 3, as a result of which said air bubble 6 can be transported further away from the slave cylinder 2 via the siphon 4a out of the hydraulic section 1 in a customary way.

LIST OF ELEMENTS

1 Hydraulic section
2 Slave cylinder
3 Master cylinder
4 Hydraulic line
4a Line section/siphon
4b Line section/riser
5 Ventilating device
6 Air bubble
10 Housing
11 Connector
12 Hole
13 Hole
13a Inner wall
14 Chamber
15 Region
A Region
L Length

The invention claimed is:

1. A hydraulic section for actuating a vehicle clutch, comprising a master cylinder, a slave cylinder, a hydraulic line which connects the master cylinder and the slave cylinder that is divided by a ventilating device into two line sections, the ventilating device including a housing defining a chamber, said line sections of the hydraulic line which act as a siphon and a riser are guided together to the chamber of the ventilating device and include ends having openings that are spaced apart from one another and an axis of each of the openings are parallel to each other and offset from each other, an uninterrupted flowpath is defined between the ends in the chamber, the openings are located at opposite axial ends of the chamber, the chamber includes an upper region defined by a radially extending wall and a circumferentially extending wall, and the upper region is positioned above both of the openings.

2. The hydraulic section as claimed in claim 1, wherein the end of the siphon is configured as a connector to the ventilating device.

3. The hydraulic section as claimed in claim 1, wherein the end of the line section of the hydraulic line which acts as the siphon opens with a hole laterally at a top into the chamber, and an inner wall of the end of a hole of the line section of the hydraulic line which acts as the riser forms a lower boundary of the chamber in a radial direction.

4. The hydraulic section as claimed in claim 3, wherein the hole of the line section of the hydraulic line which acts as the riser is routed further with a length (L) in the housing and an internal diameter of the housing is widened radially at least over a region (A) of said length (L).

5. The hydraulic section as claimed in claim 4, wherein the radial widening of the internal diameter of the housing forms the chamber in the housing in the axial direction at least over the region (A).

6. The hydraulic section as claimed in claim 1, wherein the ventilating device is arranged in the hydraulic line at a highest point of the line section which comes from the slave cylinder.

7. The hydraulic section as claimed in claim 5, wherein an end face of a connector which is introduced into the housing forms an axial boundary of the chamber in the housing.

8. The hydraulic section as claimed in claim 1, wherein the hydraulic section has a plurality of the ventilating devices.

* * * * *